United States Patent
Habermann et al.

(10) Patent No.: US 8,015,451 B2
(45) Date of Patent: Sep. 6, 2011

(54) CONTROLLING AN UNRELIABLE DATA TRANSFER IN A DATA CHANNEL

(75) Inventors: Christian Habermann, Boeblingen (DE); Christian Jacobi, Schoenaich (DE); Matthias Pflanz, Holzgerlingen (DE); Hans-Werner Tast, Weil im Schoenbuch (DE); Ralf Winkelmann, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 12/356,191

(22) Filed: Jan. 20, 2009

(65) Prior Publication Data

US 2009/0193308 A1 Jul. 30, 2009

(30) Foreign Application Priority Data

Jan. 24, 2008 (EP) .................................... 08150586

(51) Int. Cl.
*G06F 11/00* (2006.01)
(52) U.S. Cl. .................... 714/43; 714/704; 714/708
(58) Field of Classification Search .................. 714/43, 714/704, 708, 712
See application file for complete search history.

(56) References Cited

U.S. PATENT DOCUMENTS

| | | | |
|---|---|---|---|
| 5,513,185 A * | 4/1996 | Schmidt ........................ | 714/708 |
| 5,699,365 A * | 12/1997 | Klayman et al. .............. | 714/708 |
| 6,438,717 B1 * | 8/2002 | Butler et al. .................. | 714/704 |
| 6,477,669 B1 * | 11/2002 | Agarwal et al. ............... | 714/708 |
| 6,728,918 B1 * | 4/2004 | Ikeda et al. .................... | 714/748 |
| 6,741,554 B2 * | 5/2004 | D'Amico et al. .............. | 370/225 |
| 6,952,734 B1 * | 10/2005 | Gunlock et al. ............... | 709/227 |
| 7,162,676 B2 * | 1/2007 | Coleman et al. .............. | 714/752 |
| 7,689,814 B2 * | 3/2010 | Okawa .......................... | 712/227 |
| 2006/0080581 A1 * | 4/2006 | Ono ............................... | 714/704 |
| 2007/0106922 A1 * | 5/2007 | Obuchi et al. ................. | 714/704 |
| 2008/0256421 A1 * | 10/2008 | Gerstel et al. ................. | 714/776 |

OTHER PUBLICATIONS

Polianskikh et al. "Design and Implementation of Error Detection and Correction Circuitry for Multilevel Memory Protection", Proceedings of the 32nd IEEE International Symposium, on Multiple-Valued Logic (ISMVL '02).
Yamada "Selector-Line Merged Built-in ECC Technique for DRAM's", IEEE Journal of Solid-State Circuits, vol. SC-22, No. 5, Oct. 1987, pp. 868-873.
Vaidya "Comparison of Duplex and Triplex Memory Reliability", IEEE Transactions on Computers, vol. 45, No. 4, Apr. 1996, pp. 503-507.

* cited by examiner

*Primary Examiner* — Marc Duncan
(74) *Attorney, Agent, or Firm* — Steven Chiu

(57) ABSTRACT

Controlling an unreliable data transfer in a data channel from a transmitting unit to a receiving unit. A bypass mode or a buffer mode is activated depending on the error rate in the data channel. If bypass mode is selected, data packets are directly transferred in probation from the transmitting unit to the receiving unit by a bypass line. The data packets are error checked after the data transfer. If buffer mode is selected, data is transfer from the transmitting unit to the receiving unit by a buffer line via an error detecting and correcting unit and a buffer unit. The errors are detected and corrected during the data transfer.

18 Claims, 4 Drawing Sheets

CONTROLLING AN UNRELIABLE DATA TRANSFER IN A DATA CHANNEL

BACKGROUND

1. Field of the Invention

The present invention relates to a method for controlling an unreliable data transfer in a data channel. Further, the present invention relates to an apparatus for controlling an unreliable data transfer in a data channel.

2. Description of the Related Art

In an arbitrary data transfer channel between a transmitting unit and a receiving unit errors may occur. The detection and correction of said errors requires a lot of time. In particular, if a central processing unit of a processor system fetches data from higher level caches, then data will be delivered with different latencies. Said latencies depend on the cache level. For performance reasons, a fast response is preferred. For data integrity reasons, an error-free data transfer is required. Higher level caches are physically far away from lower level caches or from the central processing unit itself. Higher level caches have longer latencies.

Long data transfer from one cache level to another cache level are more susceptible to transient and permanent errors at interfaces, transfer hardware, data buses or the like. Said long data transfer is also performed over chip boundaries. Error checking and correcting hardware have significant additional delay effect on the overall transfer latency.

In known systems there is either an optimal tradeoff checking and correcting overhead or a rich system performance. The main problem of known systems is a design decision and a static implementation for the benefit of a fast data throughput or a reliable data transfer. The speed-optimized data transfer systems have the drawback of poor checking features and thus a potential data integrity problem. The fail-save data transfer has the drawback of poor system performance.

The article "Design and Implementation of Error Detection and Correction Circuitry for Multilevel Memory Protection" by Boris Polianskikh and Zeljko Zilic (Proceedings of the 32nd IEEE International Symposium on Multiple-Valued Logic (ISMVL'02), 2002), incorporated herein by reference, relates to single-error-correcting and double-error-detecting in multi-level dynamic random access memories.

The article "Comparison of Duplex and Triplex Memory Reliability" by Nitin H. Vaidya (IEEE Transactions on Computers, Vol. 45, No. 4, April 1996, pp. 503-507), incorporated herein by reference, describes a classical approach in fail-save architectures.

The article "Selector-Line Merged Built-In ECC" by Junzo Yamada (IEEE Journal of Solid-State Circuits, Vol. SC-22, No. 5, October 1987, pp. 868-873), incorporated herein by reference, deals with the optimization of checking and correcting circuits.

It is an object of the present invention to provide an improved method and apparatus for controlling an unreliable data transfer in a data channel.

BRIEF SUMMARY

The above object is achieved by an apparatus and a method as laid out in the independent claims. Further advantageous embodiments of the present invention are described in the dependent claims and are taught in the description below.

The advantages of the invention are accomplished by a dynamic change between a path with an error correction and a further path without an error correction in dependence of an error rate. The path with the error correction is slower than the path without the error correction. The receiver may comprise error detection means.

A probation mode control circuit is provided for controlling an on-demand data transfer protected by an error detecting and correcting unit. The error detecting and correcting unit controls the delivery of data in a direct manner, if no error has occurred on previous data. In this situation, the data transfer is in probation, and the data transfer is in a bypass mode with a trailing error checking, wherein data are checked afterwards. If an error is detected on previous data, then the control hardware assumes further errors on next data. The data transfer is restricted to a slower buffer mode with the direct error detection and correction. For a predetermined amount of data packets without any error, the control hardware switches back into the faster bypass mode.

The present invention guarantees a maximum system performance due to the fast data delivery if no errors occur, and a speed restricted data delivery if errors occur. The speed restricted data delivery allows a fail-save data delivery in the case of one or more errors.

BRIEF DESCRIPTION OF THE SEVERAL VIEWS OF THE DRAWINGS

The above as well as additional objectives, features and advantages of the present invention will be apparent in the following detailed written description.

The novel and inventive features believed characteristic of the invention are set forth in the appended claims. The invention itself, their preferred embodiments and advantages thereof will be best understood by reference to the following detailed description of preferred embodiments in conjunction with the accompanied drawings, wherein:

DETAILED DESCRIPTION

Figure 1:
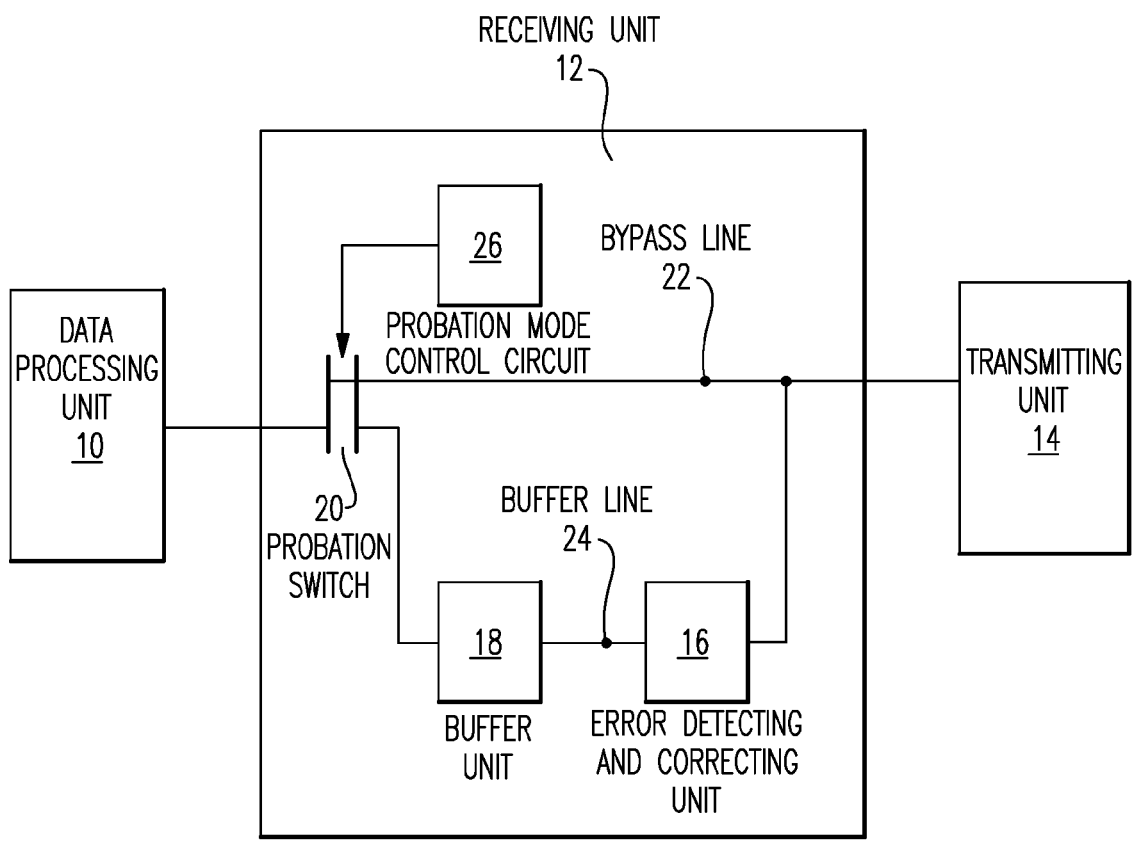
FIG. 1 illustrates a schematic diagram of a data transfer channel according to a preferred embodiment of the present invention.

FIG. 1 illustrates a schematic diagram of a data transfer channel according to a preferred embodiment of the present invention. The data transfer channel comprises a data processing unit 10, a receiving unit 12 and a transmitting unit 14. The receiving unit 12 includes an error detecting and correcting unit 16, a buffer unit 18, a probation switch 20 and a probation mode control circuit 26.

The transmitting unit 14 and the probation switch 20 are connected via a bypass line 22 and a buffer line 24. The bypass line 22 and the buffer line 24 are connected in parallel. The transmitting unit 14 and the probation switch 20 are directly connected via the bypass line 22. The buffer line 24 connects serially the transmitting unit 14, the error detecting and correcting unit 16, the buffer unit 18, the probation switch 20 and the data processing unit 10. The probation switch 20 may be implemented by a multiplexer. The probation switch 20 is controlled by the probation mode control circuit 26.

The bypass line 22 and the buffer line 24 are two concurrent paths for incoming data packets. Either the bypass line 22 or the buffer line 24 is activated by the probation switch 20. The path via the buffer line 24 includes the error detecting and correcting unit 16. The error detecting and correcting unit 16 is provided to detect and correct errors, which happen during data transfer over an unreliable channel. The other path via the bypass line 22 is a direct path without the feasibility of any error detecting and correcting unit 16. The transfer over the bypass line 22 is faster than the transfer over the buffer line 24 with the error detecting and correcting unit 16. The bypass line 22 bypasses the buffer line 24 with the error detecting and correcting unit 16.

For error rates not equal to zero, the data transfer over the error detecting and correcting unit 16 should be preferred. Without any errors the data transfer can be carried out via the faster bypass line 22. With a sporadic occurrence of errors, e.g. soft errors, during the operation, the probation switch 20 between the bypass line 22 and the buffer line 24 would be reasonable. This example describes the implementation of the dynamic probation switch 20 between the bypass line 22 and the buffer line 24 depending on occurred errors. The data transfer is carried out concurrently over both channels, i.e. the bypass line 22 and the buffer line 24. Thus, data are transferred fast to the data processing unit 10.

At the same time the error detecting and correcting unit 16 detects errors and reports the result to the data processing unit 10 after relative fast data has been arrived. The data processing unit 10 is able to reject the already received data in an error case. The faster transfer of data reduces the latency to the data processing unit 10. The fast transfer over the bypass line 22 and the error checking at the same time in the slower channel via the buffer line 24 is called probation mode.

If an error occurred, then said probation mode is elapsed and the data processing unit 10 rejects erroneous data. The data transfer to the data processing unit 10 is then switched by the probation switch 20 to the slower path via the buffer line 24, but with the error detecting and correcting unit 16. Corrected data are then provided to the data processing unit 10. The transfer over the slower path via the buffer line 24 is carried out as long as no errors happened for a predetermined amount of transferred data packets, e.g. no error occurrence during a programmable time frame.

Figure 2:
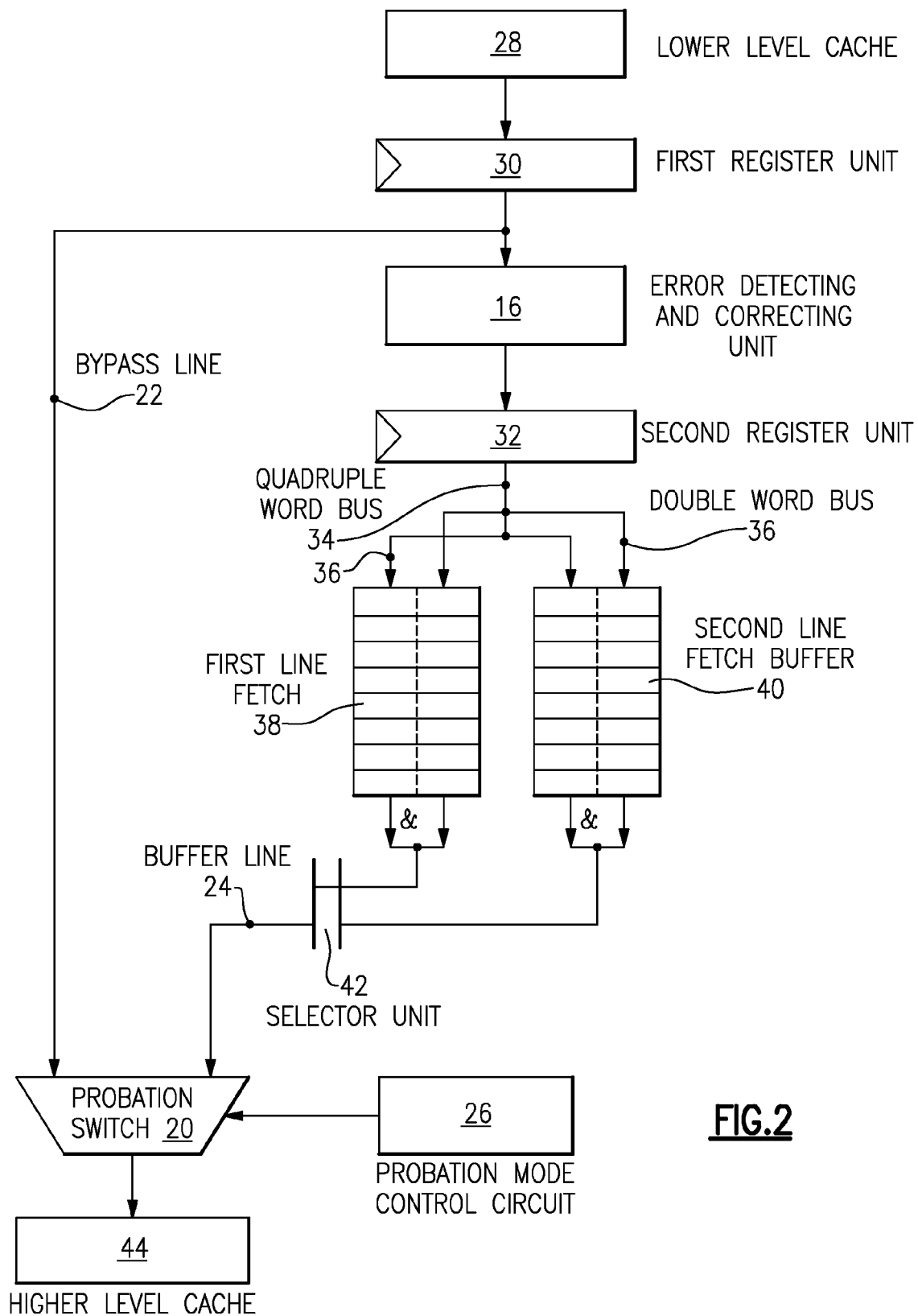
FIG. 2 illustrates a detailed diagram of an implementation of the data transfer channel according to the preferred embodiment of the present invention.

FIG. 2 illustrates a detailed diagram of an implementation of the data transfer channel according to the preferred embodiment of the present invention. Said data transfer channel is arranged between a lower level cache 28 and a higher level cache 44. For example, if the data transfer channel is arranged within a microprocessor circuit, then the higher level caches 44 are closer to the core of the microprocessor circuit than the lower level caches 28.

The implementation of the data transfer channel comprises a first register unit 30, the error detecting and correcting unit 16, a second register unit 32, a first line fetch buffer 38, a second line fetch buffer 40, a selector unit 42, the probation switch 20 and the probation mode control circuit 26. The probation switch 20 is implemented by a two-input-multiplexer.

The first register unit 30 is interconnected between the lower level cache 28 and the error detecting and correcting unit 16. Further, the first register unit 30 is connected to a first input terminal of the probation switch 20. The error detecting and correcting unit 16 is connected to a second register unit 32. The second register unit 32 is connected to input terminals of the line fetch buffers 38 and 40 via a quadruple word bus 34, wherein the quadruple word bus 34 is subdivided into two double word busses 36. In this example, the line fetch buffers 38 and 40 are provided for sixteen quadruple data words, respectively.

The output terminals of the first line fetch buffer 38 and the second line fetch buffer 40 are connected to the selector unit 42. The selector unit 42 is a toggle-switch selecting between the line fetch buffers 38 and 40. For example, the selector unit 42 is also implemented by a two-input-multiplexer. Further, the selector unit 42 is connected to a second input terminal of the probation switch 20. An output terminal of the probation switch 20 is connected to the higher level cache 44.

The probation mode control circuit 26 delivers data from an interface of the transmission unit 14 directly to the data processing unit 10 via the bypass line 22. The probation mode control circuit 26 delivers data from the lower level cache 28 directly to the higher level cache 44. The interface of the transmission unit 14 is an unreliable channel. At the same time, the probation mode control circuit 26 observes a so-called trailing error detection, i.e. data are checked afterwards.

In the case of a correctable error in one data packet on a line coming from the lower level cache 28, the probation mode control circuit 26 will transfer a programmable number of N data packets via the bypass line 22 or via the buffer line 24 with the error detection and correction and with buffering of data. Only if no further error is detected again over the N data packets, then the probation mode control circuit 26 can switch back into the faster bypass mode 62 without a direct inline error correction.

If an error occurs in the bypass mode 62, then the data packet will be rejected. Then the data packet has to be re-fetched from the transmitting unit 14, i.e. from the lower level cache 28. This requires at least about hundred core cycles until data have returned. In order to keep the buffer mode 64 for the N data packets on the probation mode before it is switched back to the bypass mode 62, faster permanent errors at the data channel, e.g. cable or connectors, or the correctable errors due to recurring soft errors in a weak hardware have to be handled. The present invention improves the availability of the system at an acceptable level while sustaining the system performance.

Figure 3:
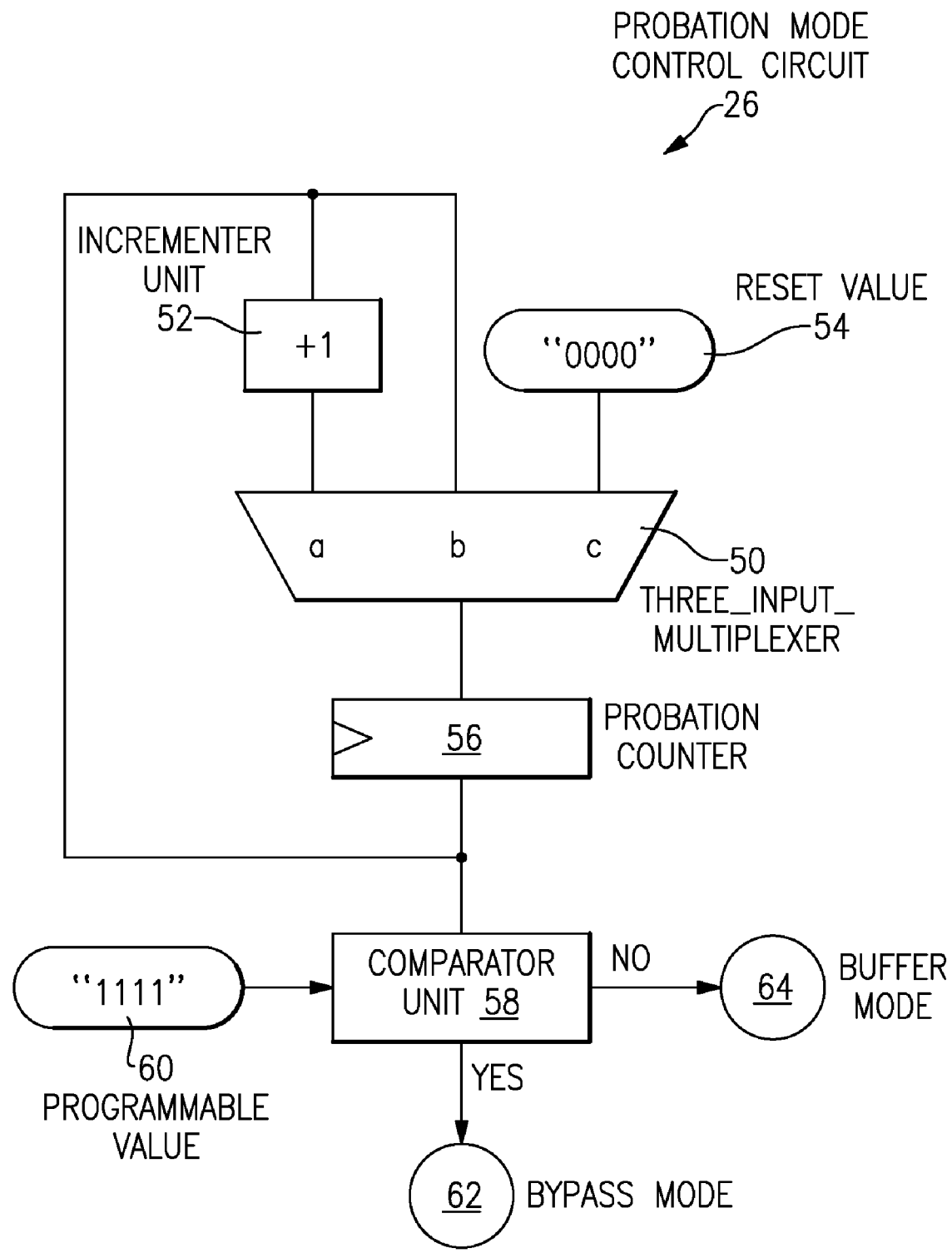
FIG. 3 illustrates a schematic diagram of a preferred embodiment of a probation mode control circuit according to the present invention.

FIG. 3 illustrates a schematic diagram of the probation mode control circuit 26 according to the preferred embodiment of the present invention. The probation mode control circuit 26 comprises a three-input-multiplexer 50, an incrementer unit 52, a probation counter 56 and a comparator unit 58. A reset value 54 and a programmable value 60 are adjusted or adjustable. The bypass mode 62 and the buffer mode 64 are alternately switchable by the probation switch 20, which is controlled by the probation mode control circuit 26.

An output terminal of the incrementer unit 52 is connected to a first input terminal of the three-input-multiplexer 50. The reset value 54 is applied on a third input terminal of the three-input-multiplexer 50. In this example the reset value 54 has the binary value "0000". An output terminal of the three-input-multiplexer 50 is connected to an input terminal of the probation counter 56.

An output terminal of the probation counter 56 is connected to a second input terminal of the three-input-multiplexer 50, to an input terminal of the incrementer unit 52 and to a first input terminal of the comparator unit 58. The programmable value 60 is applied on a second input terminal of the comparator unit 58. In this example the programmable value 60 has the binary value "1111". In general, the programmable value 60 may be an arbitrary binary value. The programmable value 60 is adapted or adaptable to the error rate of the data channel. An output terminal of the comparator unit 58 is provided for activating the bypass mode 62. A further output terminal of the comparator unit 58 is provided for activating the buffer mode 64.

The three-input-multiplexer 50 activates the state on the first output terminal, i.e. the state of the incrementer unit 52, if the data transfer is in progress and no error on the interface of the transmission unit 14 occurs. The three-input-multiplexer 50 activates the state on the second output terminal, i.e. the actual state of the probation counter 56, if no data transfer is in progress. The state on the third output terminal of the three-input-multiplexer 50 is activated if an error on the interface of the transmission unit 14 occurs.

Figure 4:
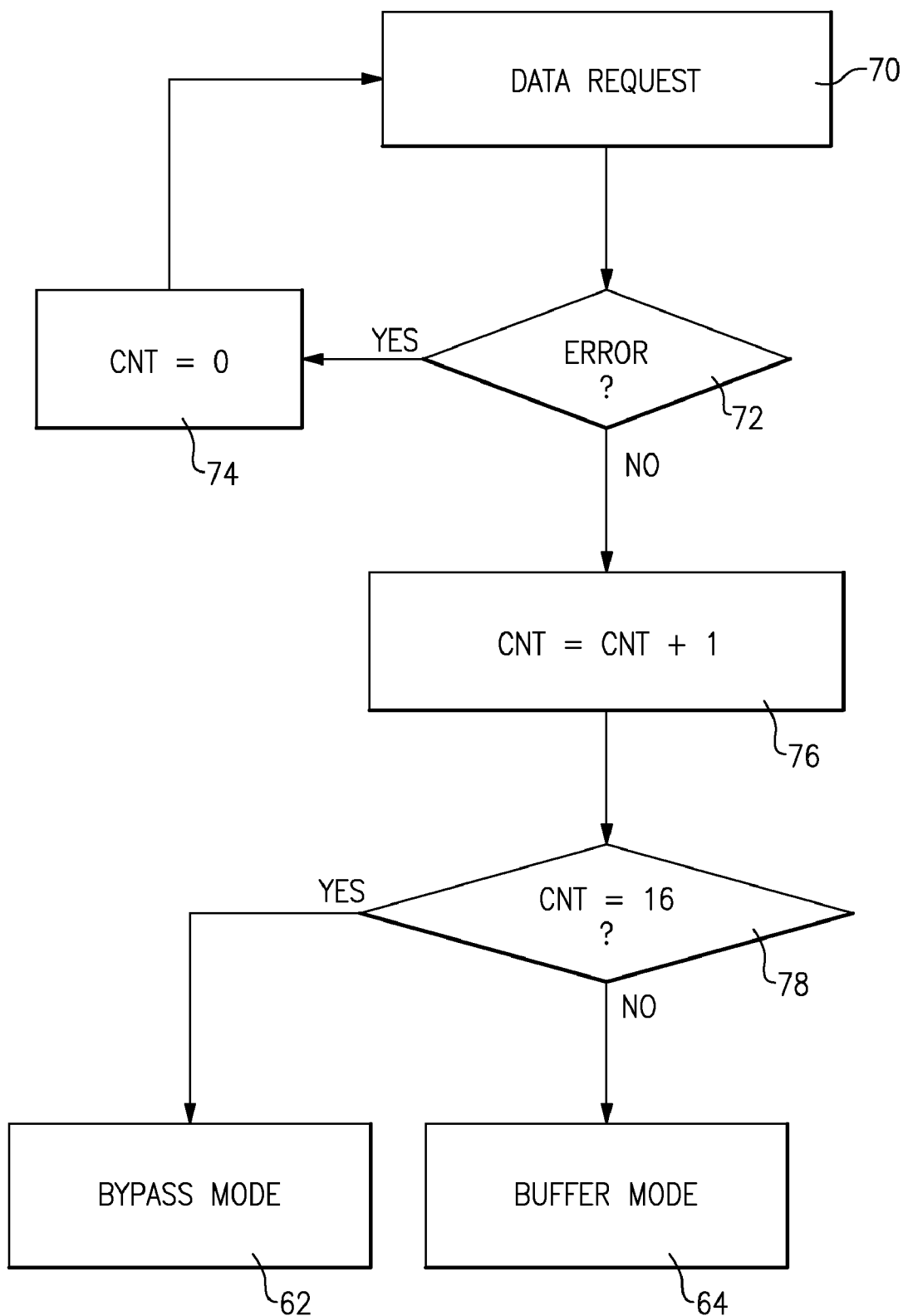
FIG. 4 illustrates a schematic flow chart diagram of a method for controlling the data transfer channel according to the preferred embodiment of the present invention.

FIG. 4 illustrates a schematic flow chart diagram of a method for controlling the data transfer channel according to the preferred embodiment of the present invention.

In a first step 70 a data request is performed. In a next step 72 it is determined, if an error has occurred. If an error has occurred, then the probation counter 56 is set to zero in a step 74. If no error has occurred, then the probation counter 56 is incremented by one in a step 76. In a next step 78 it is compared, if the actual counter value has reached a predetermined value. In the example of FIG. 4 the predetermined value is "16". If the actual counter value has reached said predetermined value, then a bypass mode 62 is activated. If the actual counter value has not yet reached said predetermined value, then a buffer mode 64 is activated.

In general, the apparatus and method for controlling an unreliable data transfer in a data channel according to the present invention are provided for an arbitrary data channel. In particular, the apparatus and method of the present invention are provided for a data channel within a semiconductor chip, e.g. a microprocessor.

The present invention can also be embedded in a computer program product which comprises all the features enabling the implementation of the methods described herein. Further, when loaded in computer system, said computer program product is able to carry out these methods.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

The invention claimed is:

1. A method for controlling an unreliable data transfer in a data channel from a transmitting unit to a receiving unit comprising:
    activating a bypass mode or a buffer mode depending on the error rate in the data channel;
    if bypass mode is selected, directly transferring data packets in probation from the transmitting unit to the receiving unit by a bypass line, wherein the data packets are error checked after the data transfer;
    if buffer mode is selected, transferring data from the transmitting unit to the receiving unit by a buffer line via an error detecting and correcting unit and a buffer unit, wherein errors are detected and corrected during the data transfer; and
    wherein the data transfer is performed from a lower level cache to a higher level cache.

2. The method according to claim 1, wherein the bypass mode is activated after a predetermined amount of data packets without any error are transferred in the buffer mode.

3. The method according to claim 1, wherein the buffer mode is activated after an error was detected on a previous data packet transferred in the bypass mode.

4. The method according to claim 1, wherein the data packet is rejected if an error occurs in the bypass mode.

5. The method according to claim 4, wherein the data packet is re-fetched from the transmission unit after the data packet has been rejected.

6. The method according to claim 1, wherein the data channel is within a microprocessor system.

7. The method according to claim 1, wherein the higher level cache is closer to a core of a microprocessor system than the lower level cache.

8. An apparatus for controlling an unreliable data transfer in a data channel from a transmitting unit to a receiving unit, comprising:
    a bypass line;
    a buffer line connected in parallel with the bypass line;
    an error detecting and correcting unit;
    a buffer unit serially connected with the error detecting and correcting unit by the buffer line;
    a probation switch that switches to the bypass line or the buffer line depending on an error rate in the data channel;
    wherein the transmitting unit and the receiving unit are directly connected by the bypass line; and
    wherein the transmitting unit and the receiving unit are connected by the buffer line via the error detecting and correcting unit and the buffer unit;
    a lower level cache; and
    a higher level cache, wherein the data transfer is from the lower level cache to the higher level cache.

9. The apparatus according to claim 8, wherein the probation switch is controlled by a probation mode control circuit.

10. The apparatus according to claim 8, wherein the error detecting and correcting unit and the buffer unit are arranged within the receiving unit.

11. The apparatus according to claim 8, wherein the buffer line, the error detecting and correcting unit and the buffer unit are used to re-fetch a data packet from the transmission unit after the data packet has been rejected.

12. The apparatus according to claim 8, further comprising a microprocessor system containing the data channel.

13. The apparatus according to claim 8, further comprising a microprocessor system containing the data channel, wherein the higher level cache is arranged closer to a core of the microprocessor system than the lower level cache.

14. The apparatus according to claim 8, wherein the apparatus is realized in hardware, software or a combination of hardware and software.

15. A computer program product for controlling an unreliable data transfer in a data channel from a transmitting unit to a receiving unit, said computer program product comprising:
    a non-transitory computer readable medium;
    first program instructions to activate a bypass mode or a buffer mode depending on the error rate in the data channel;
    second program instructions to, if bypass mode is selected, directly transfer data packets in probation from the transmitting unit to the receiving unit by a bypass line, wherein the data packets are error checked after the data transfer;

third program instructions to, if buffer mode is selected, transfer data from the transmitting unit to the receiving unit by a buffer line via an error detecting and correcting unit and a buffer unit, wherein errors are detected and corrected during the data transfer;

wherein the data transfer is performed from a lower level cache to a higher level cache; and wherein said first, second, and third program instructions are stored on said computer readable media.

16. The computer program product according to claim 15, wherein the bypass mode is activated after a predetermined amount of data packets without any error are transferred in the buffer mode.

17. The method according to claim 15, wherein the buffer mode is activated after an error was detected on a previous data packet transferred in the bypass mode.

18. The method according to claim 15, wherein the data packet is rejected if an error occurs in the bypass mode.

* * * * *